Aug. 19, 1941.   C. G. BRODD   2,253,106
CHUCK
Filed Feb. 15, 1940   2 Sheets-Sheet 1

Inventor:
Charles G. Brodd,
by: John E. Jackson
his Attorney.

Aug. 19, 1941.   C. G. BRODD   2,253,106
CHUCK
Filed Feb. 15, 1940   2 Sheets-Sheet 2
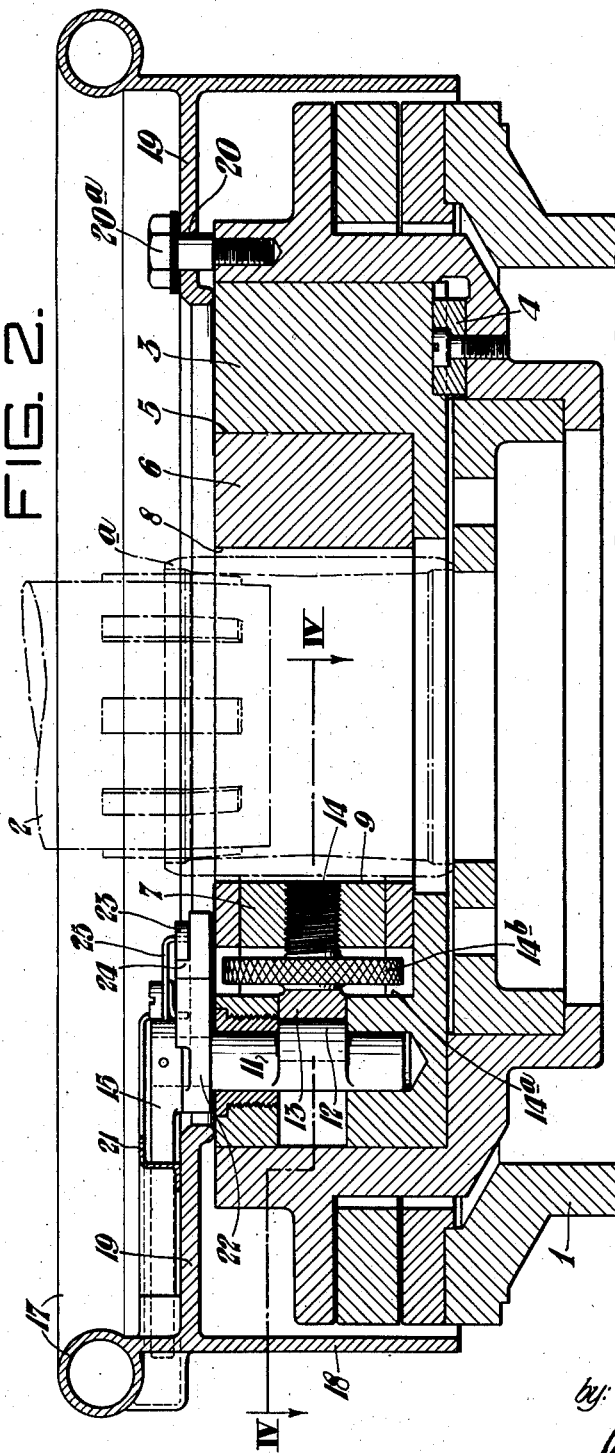
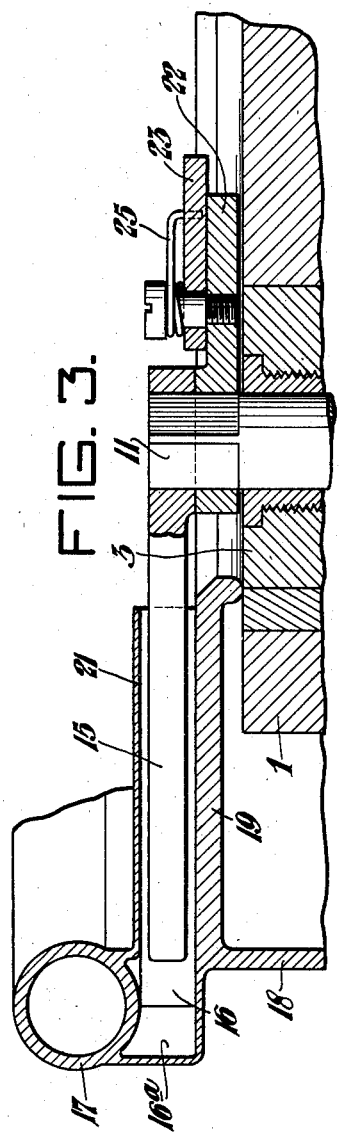
Inventor:
CHARLES G. BRODD,
by: John E. Jackson
his Attorney.

Patented Aug. 19, 1941

2,253,106

UNITED STATES PATENT OFFICE 2,253,106

CHUCK

Charles G. Brodd, McKeesport, Pa., assignor to National Tube Company, a corporation of New Jersey Application February 15, 1940, Serial No. 319,152

10 Claims. (Cl. 10—107)

This invention relates to improvements in chucks and the like.

It is an object of my invention to provide a simple and efficient apparatus for the opening and closing of such a chuck, and to eliminate the commonly used detachable hand wrench, thereby reducing the hazard of injury to the operator as when such a wrench becomes inadvertently engaged with a rotating part of the apparatus.

A further object is to reduce the time consumed in engaging and disengaging the chuck and the work to thereby increase the production of machine and operator.

A still further object is to provide for the forcible disengagement of the work from the chuck grip upon opening the chuck.

Additional objects and advantages will become apparent from the following description taken in connection with the accompanying drawings, wherein:

Figure 2 is a sectional view taken on the line II—II of Figure 1;

Figure 3 is a detail sectional view taken on the line III—III of Figure 1; and,

Figure 1:
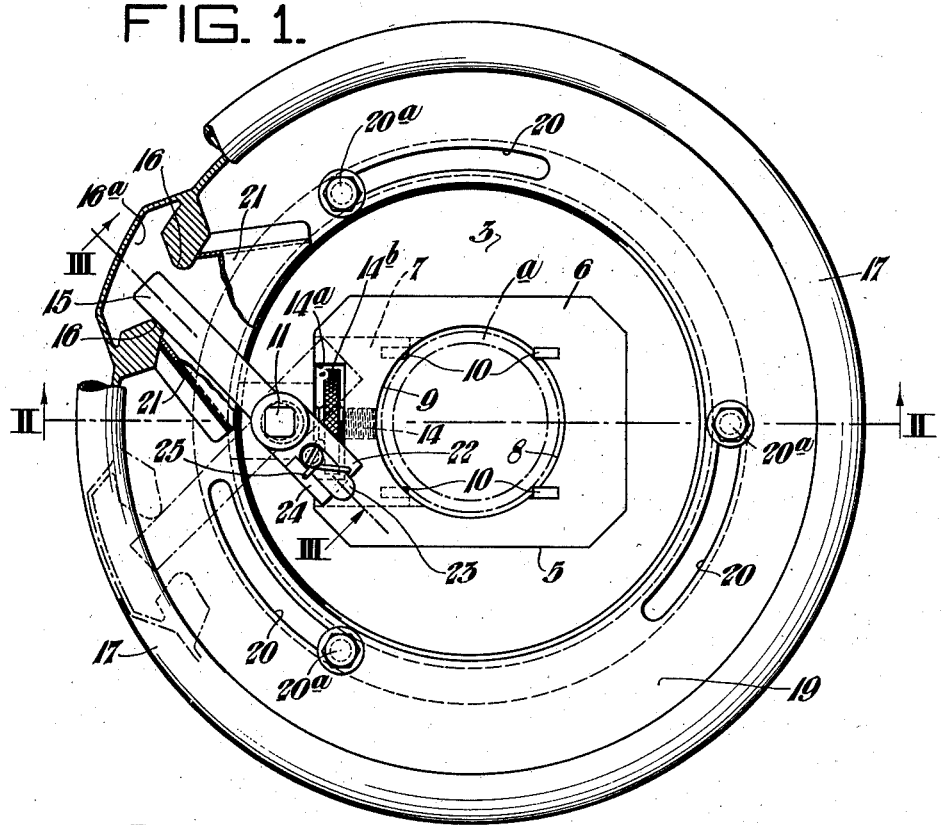
Figure 1 is a plan view of a threading machine chuck or the like embodying my invention.
Figure 4:
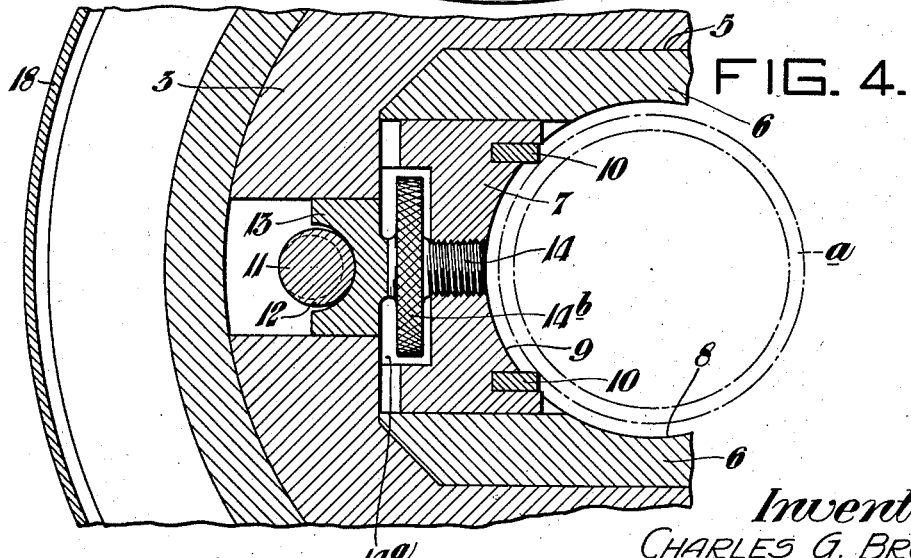
Figure 4 is a detail section taken on the line IV—IV of Figure 2.

Referring to the drawings, I have illustrated my invention as adapted to the rotating chuck 1 of a vertical tapping machine employed for tapping couplers and the like, wherein the tap or thread die 2 does not rotate and is raised and lowered in relation to the chuck and the work positioned in the latter, such illustration being by way of example only, since the features of my invention may be incorporated in other chucks to attain similar advantages and results.

The chuck 1 is rotatably driven in any suitable manner and includes a central housing 3 keyed to the chuck body at 4, the housing being recessed at 5 to receive a pair of chuck grips or jaws 6 and 7. The jaw 6 extends throughout the recess and is stationary therein, and is provided with a central vertical work-receiving aperture 8. a designates a cylindrical coupling or the like positioned in said aperture for tapping.

The jaw 7 is horizontally slidable in the jaw 6 at one side of the aperture 8, and has a concave face 9 presented toward the coupling a, each of said jaws 6 and 7 having vertical bits or teeth 10 projecting into the aperture 8 for engaging and securing the coupling for rotation with the chuck.

Adjacent the jaw 7, a vertical cam shaft 11 is mounted in the housing 3 having a cam 12 thereon for urging the said jaw into work-engaging position. 13 designates a follower movable in the housing 3 and engageable by the cam. 14 is a thumb screw threaded in the jaw 7 and contacted by the follower 13 for moving the jaw, said screw being adjustable for varying the locus of movement of said jaw in relation to the aperture 8 to compensate for variations in the diameter of the work or coupling a.

To enable ready manipulation of the screw 14, vertical recesses 14ª are formed in the jaws 6 and 7, and the knurled head 14ᵇ of the screw is disposed therein for access from the top of the chuck.

For the purpose of rotating the shaft 11 and its cam 12 to manipulate the jaw 7, the upper end of said shaft is provided with a radial arm or lever 15 extending outwardly toward the periphery of the chuck. The free terminal of lever 15 is disposed in the annular path of a pair of spaced abutments 16 carried by a handwheel or rim 17 rotatable on the chuck body 2, said wheel including a depending cylindrical shroud 18 disposed outwardly of, and an inwardly extending flange 19 disposed over, the chuck. The flange 19 is arcuately slotted at 20 for permitting rotation of the wheel 17 on studs or bolts 20ª by which the wheel is secured to the chuck proper. As preferred, the handwheel may be provided with a recess 16ª to receive and enclose the terminal of the lever 15.

The actuating lever 15 is rotated by the wheel 17, operating cam 12 to engage the jaw 7 with the work or coupling a. The arcuate travel of the lever 15 is preferably enclosed within a guard 21 secured to the flange 19 of the handwheel 17, said guard enclosing the engagement of the lever with abutments 16 to prevent injury to the operator during manipulation of the chuck.

During the engagement of the chuck jaws and the coupling to be tapped, the teeth 10 forcibly contact the surface of the coupling, and tend to cling thereto upon releasing the jaw pressure. This tendency may be obviated by providing a radial arm 22 on the cam shaft 11 extending toward the coupling a, said arm having a dog 23 extending therefrom.

The dog 23 is pivoted at its inner end to the arm 22, the latter having an abutment 24 preventing displacement of the dog during travel of the arm in the direction of movement of the cam 12 to relieve the pressure of the cam on the jaw 7, which movement is imparted to the shaft 11 by lever 15 and a reverse rotation of the handwheel 17. Dog 23 projects toward the work a sufficient distance to engage said work and separate the jaw 7 therefrom, whereupon the work or coupling a may be lifted away from the bits 10 of the jaws.

25 designates a spring for the dog 23, whereby the dog may pivot on the arm 22 during movement of engagement of the jaw 7 with the work, during which movement the dog is displaced by and slides over the surface of the work without interfering contact.

It will therefore be seen that I have provided a simple and efficient chuck, which may be operated to quickly and easily engage and disengage the work. The large diameter of the handwheel with its associated lever, provides an increased mechanical advantage to make the actuation of the chuck considerably easier than heretofore, and to enable increased production of machine and operator.

Various changes and modifications are contemplated within the scope of the following claims.

I claim:

1. In a rotatable chuck, the combination with a pair of centrally located jaws, of a rotatable member surrounding said jaws, means for moving one of the jaws disposed adjacent thereto, and an intervening member located within the confines of and actuated by the rotatable member for actuating the jaw moving means.

2. In a rotatable chuck, the combination with a pair of centrally located jaws, of an annular rotatable member about and spaced from the jaws, means spaced inwardly of the chuck from the annular member and adjacent one of the jaws for moving said jaw, and a lever extending from said means toward and actuated by the annular member to actuate the jaw moving means.

3. In a rotatable chuck, a rotatable handwheel, a pair of jaws centrally of the chuck and handwheel, a rotatable cam for moving one of the jaws, a lever movable with the cam, said handwheel surrounding and enclosing said cam and lever and engaging the free terminal of the lever for rotation of the lever and cam.

4. In a rotatable chuck, a pair of centrally located jaws, a cam for moving one of the jaws, a lever movable with the cam and having a terminal extending in a direction away from the jaws, and a rotatable handwheel surrounding the jaws and lever, said handwheel having means spaced from the cam for engaging the terminal of and moving the lever upon rotation of the handwheel.

5. In a chuck, a pair of centrally located jaws, a cam for moving one of the jaws, a lever movable with the cam and extending in a direction away from the jaws, and a rotatable handwheel about the jaws and lever, said handwheel having a pair of spaced abutments engaging the free terminal of the lever for movement thereof by the handwheel.

6. In a chuck, a pair of centrally located jaws, a cam for moving one of the jaws, a lever movable with the cam and extending in a direction away from the jaws, a rotatable handwheel about the jaws and lever, said handwheel having means for engaging and moving the lever upon rotation of the handwheel, and a guard enclosing the movement of the lever adjacent to the handwheel.

7. A rotatable chuck having a central housing, a pair of jaws therein, a cam mounted in the housing for moving one of the jaws, a lever movable with the cam and extending outwardly beyond the jaws, a handwheel surrounding the jaws and lever and rotatably supported on the chuck, said handwheel having a pair of spaced abutments engaging opposite sides of the free terminal of the lever for movement of the lever by the handwheel, the handwheel also having a depending shroud enclosing the chuck.

8. A chuck having a pair of centrally located jaws, a cam for moving one of said jaws, a lever for actuating the cam, a rotatable handwheel surrounding the jaws and lever and having engagement with the latter for moving the movable jaw toward the work engaged by the jaws, and means operable upon a reverse movement of the lever to engage the work and move the movable jaw away from the work.

9. A chuck having a pair of jaws, a cam for moving one of the jaws, a cam shaft, a lever secured to the shaft, a handwheel about the jaws and lever having engagement with the latter to move the movable jaw toward the work engaged by said jaws upon rotation of the handwheel in one direction, and means on the shaft for engaging the work and separating the movable jaw therefrom upon a reverse rotation of the lever by the handwheel.

10. A chuck having a pair of jaws, a cam for moving one of the jaws, a cam shaft, a lever secured to the shaft, a handwheel about the jaws and lever having engagement with the latter to move the movable jaw toward the work engaged by said jaws upon rotation of the handwheel in one direction, and means on the shaft for engaging the work and separating the movable jaw therefrom upon a reverse rotation of the lever by the handwheel, said means including an arm, a dog pivoted to the arm and projecting therebeyond to engage the work, said arm having an abutment thereon to prevent movement of the dog relative to the arm upon said reverse direction of rotation, and a spring permitting displacement of the dog upon movement of the arm during engagement of the jaw and work.

CHARLES G. BRODD.